United States Patent
Clewell et al.

(10) Patent No.: US 6,834,600 B1
(45) Date of Patent: Dec. 28, 2004

(54) PLOT PLANTER

(75) Inventors: W. Scott Clewell, Milton, PA (US); Aaron Clewell, Milton, PA (US)

(73) Assignee: Clewell Precision Machine, Inc., Milton, PA (US)

( * ) Notice: Subject to any disclaimer, the term of this patent is extended or adjusted under 35 U.S.C. 154(b) by 0 days.

(21) Appl. No.: 10/783,208

(22) Filed: Feb. 20, 2004

(51) Int. Cl.[7] .............................. A01C 7/00; A01C 9/00
(52) U.S. Cl. ...................................................... 111/177
(58) Field of Search ................................ 111/170, 177, 111/183, 200, 900

(56) References Cited

U.S. PATENT DOCUMENTS

| | | | |
|---|---|---|---|
| 3,738,530 A | * | 6/1973 | Fine et al. .................. 221/211 |
| 4,285,444 A | | 8/1981 | Tye |
| 4,758,119 A | * | 7/1988 | Frase et al. ................. 406/109 |
| 4,896,616 A | | 1/1990 | Wintersteiger et al. |
| 5,392,707 A | | 2/1995 | Romans |
| 5,542,364 A | | 8/1996 | Romans |
| 6,564,730 B2 | | 5/2003 | Crabb et al. |
| 6,626,120 B2 | | 9/2003 | Bogner et al. |

* cited by examiner

*Primary Examiner*—Christopher J. Novosad
(74) *Attorney, Agent, or Firm*—Thomas R. Shaffer, Esq.

(57) ABSTRACT

A plot planter includes a top valve, two finger pickup units, a bottom valve and a controller. A top valve including a sliding block movable between a first block position and a second block position and has a first seed chamber adapted to receive a first type of seed and a second seed chamber adapted to receive a second type of seed. A first finger pickup unit communicates with the first seed chamber when the sliding block is in its first position and a second finger pickup unit communicates with the second seed chamber when said sliding block is in its second position. A bottom valve has a first position which allows seed from the first pickup unit to be delivered to a seed tube for planting while collecting seed from the second finger pickup unit and has a second position which allows seed from the second pickup unit to be delivered to the seed tube for planting while collecting seed from the first finger pickup unit. A programmable control is used to control the timing of the shifting of the top valve and the bottom valve.

21 Claims, 7 Drawing Sheets

PLOT PLANTER

BACKGROUND OF THE INVENTION

1. Field of the Invention

The present invention relates to a plot planter. More specifically it relates to a plot planter which uses two finger pickup units to enable precise control of both the beginning and end of rows of seeds of different types.

2. Description of the Prior Art

The use of plot planters for the use of research is widely used in the seed industry. In a research plot it is necessary to plant several different seed types in one field for the purpose of obtaining yield and growth data. These plot planters are responsible for planting seeds of uniform spacing, in a row of a predetermined length, one variety right after another. A variety of plot planters are known in the art. Examples of some of such known devices are shown in U.S. Pat. Nos. 6,626,120; 6,564,730; 6,401,638; 6,374,759; 6,325,005; 6,109,193; 5,542,364; 5,392,707; 4,896,616 and 4,285,444. The prior art plot planters use complicated mechanisms and electronics. While they have many features for closed loop monitoring of the planting, they are intimidating and even the simplest of problems can be hard to fix. Another problem with the prior art is the seed metering devise. Many plot planters are using air metering devises and cone metering devises. They do not respond well to rough field conditions. The seed distribution can be compromised from bumps in the field that shake the plot planter.

It is therefore the primary objective of the present invention to solve the problems identified in the prior art.

Another important objective of the present invention is to provide an affordable method of seed metering.

Another object of the present invention is to provide a seed metering device that is not overly complex, while maintaining the reliability and accuracy required in the art.

Another objective of the present invention is to provide a seed metering device that is easy to maintain and not prone to frequent break-downs.

Additional objectives and advantages will become apparent by those skilled in the art in the accompanying specification.

SUMMARY OF INVENTION

The present invention provides an accurate seed metering device using a simple industry-standard finger pickup unit. The invention uses two finger pickup units per row because the finger pickup unit is repeatable when it begins planting, but it isn't repeatable when it stops planting. This problem is overcome by using two finger pickup units per row. To control which unit plants, there are two grain valves: one positioned above the finger pickup units, and one below. These valves work together to control the alternation of which finger pickup unit is planting.

The present invention solves the problem of the prior art devices by utilizing a simple seed metering device and eliminating the complexity of wires, computers, and hydraulics. The finger pickup units solve the problem of compromised seed distribution in rough fields. The finger pickup unit itself is designed to hold the individual seed in place as it isolates it from the rest of the seeds. This reduces the chances of a bump in the field effecting the distribution.

In its simplest form, the present invention provides a plot planter comprising: a top valve including a sliding block movable between a first block position and a second block position, said sliding block having a first seed chamber adapted to receive a first type of seed and a second seed chamber adapted to receive a second type of seed; a first finger pickup unit communicating with said first seed chamber when said sliding block is in said first position and a second finger pickup unit communicating with said second seed chamber when said sliding block is in said second position; a bottom valve having a first position allowing seed from said first pickup unit to be delivered to a seed tube for planting while collecting seed from the second finger pickup unit, said bottom valve having a second position allowing seed from said second pickup unit to be delivered to said seed tube for planting while collecting seed from the first finger pickup unit; and programmable control means for controlling the timing of shifting of said top valve and said bottom valve.

Preferably the plot planter includes a linear actuator to move said sliding block between the first block position and the second block position. The linear actuator is powered with one of fluid or mechanical power.

Preferably, said first finger pickup unit communicates with said first seed chamber through a first loading tube and said second finger pickup unit communicates with said second seed chamber through a second loading tube.

The top valve, first and second finger pickup units and bottom valve are preferably each mounted onto a tubular frame.

The first finger pickup unit and second finger pickup unit are each preferably provided with a plate member to reduce the volume within said pickup units whereby increasing the likelihood that the last seeds remaining in the finger pickup units will be planted.

The first finger pickup unit and said second finger pickup unit are preferably both driven by a common drive.

A linear actuator is also preferably provided to move said bottom valve between the first position and the second position, which can also be powered with fluid or mechanical power. The programmable control means preferably further comprises a programmable relay having a sensor to count pulses generated from an encoder wheel. The first finger pickup unit and said second finger pickup unit are preferably turned by a seed shaft and said encoder wheel is mounted on said seed shaft. The encoder wheel has a plurality of pins on a face thereof and the pins are timed with the distance that said plot planter travels whereby when the sensor counts a predetermined number of pins the plot planter will have moved a known fixed distance and said relay will shift the top valve and bottom valve to cause seed of a different kind to be planted thereafter. Preferably, the top valve is shifted first and after a few more counts the bottom valve is shifted.

The relay can preferably be reset to begin counting pins again by actuating a simple switch controlled by an operator of the plot planter. In the preferred embodiment of the invention, the encoder wheel has 24 pins thereon and said planter travels $\frac{1}{24}^{th}$ of a revolution of said encoder wheel when said planter travels 2.5 inches.

The programmable control means can be programmed to precisely control the spacing between individual seeds of a first seed type being planted and the length of a row of a said first seed type before the top valve and bottom valve are shifted to plant a second seed type.

Preferably, the second valve further comprises a container to collect excess seeds from the first finger pickup unit and the second finger pickup unit when such seed are being collected and not planted. Such container is preferably of sufficient volume to hold several seed from several plots with excess seeds.

A funnel is preferably provided to facilitate loading of seeds into said first seed chamber and said second seed chamber.

DETAILED DESCRIPTION OF THE PREFERRED EMBODIMENT

Figure 1:
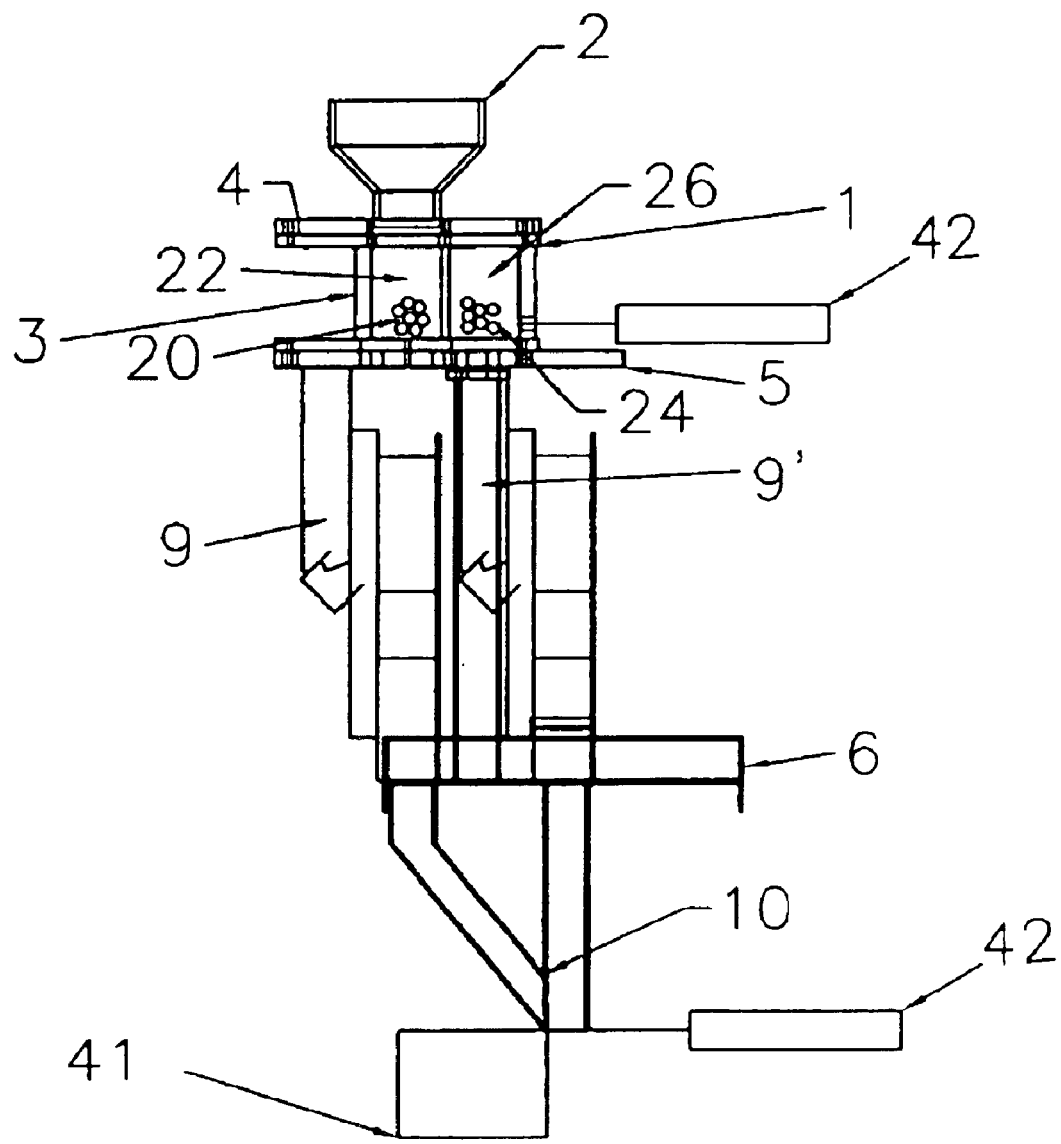
FIG. 1 is a front view of the assembled present invention.

Referring to the Figures, a top valve 1 is provided with a loading funnel 2, a top plate 4, a sliding block 3, and a bottom plate 5. The function of this top valve 1 is to hold a given number of seeds until the appropriate time when the top valve 1 is shifted. A first type of seed 20 is provided in a first seed chamber 22 and a second type of seed 24 is provided in a second seed chamber 26, both chambers located in sliding block 3.

A plot for the purposes of research can be any length; however that are typically focused around 20 feet long. This length requires a certain number of seeds. These seeds are counted, packaged, and arranged in a manner for easy retrieval prior to the planting of the plot. During operation of the present invention, the seed package is opened and dumped into the loading funnel 2. The seeds fall through the loading funnel 2 and into one of chamber 22 or 26 of the sliding block 3. This block is attached to a linear actuator, being of fluid power or mechanical power. Block 3 has two chambers 22 and 26 of a given volume that is sufficient to hold the given number of seeds.

Figure 4:
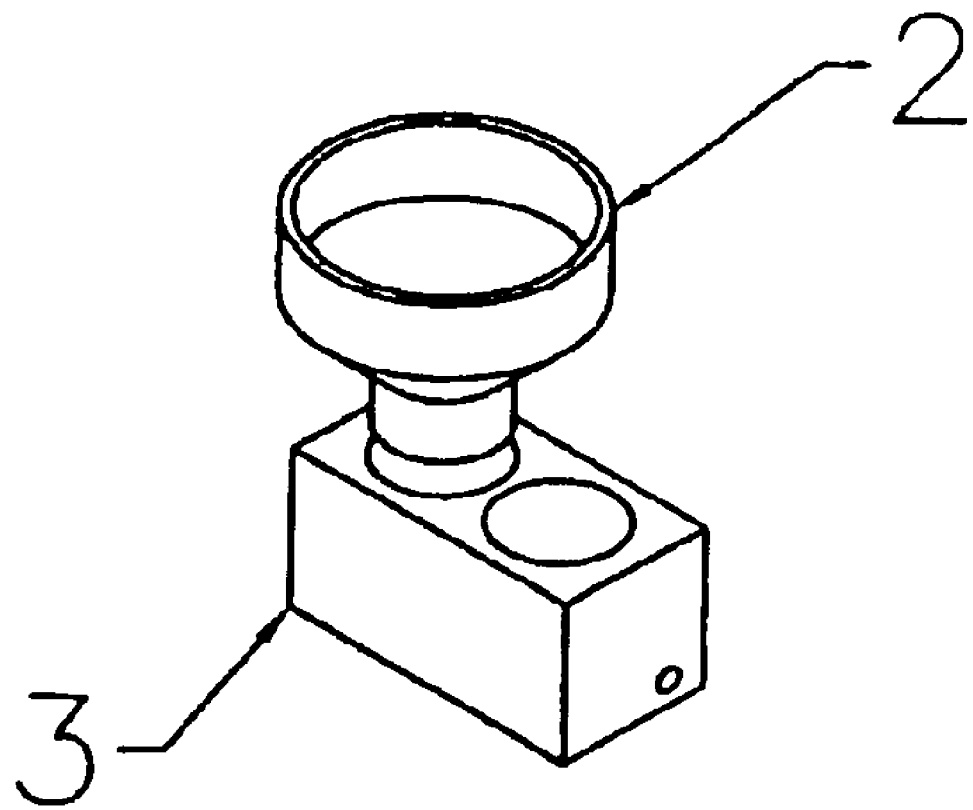
FIG. 4 is a drawing that illustrates how the sliding block and loading funnel are oriented to one another. The top and bottom plates have been excluded from this drawing.

FIG. 4 shows the orientation of the loading funnel 2 and the sliding block 3. At the appropriate time, the top valve 1 will shift. This will allow the seeds to proceed down a loading tube 9 and into a first finger pickup unit 7 (or down loading tube 9' into a second finger pickup unit 7').

Figure 2:
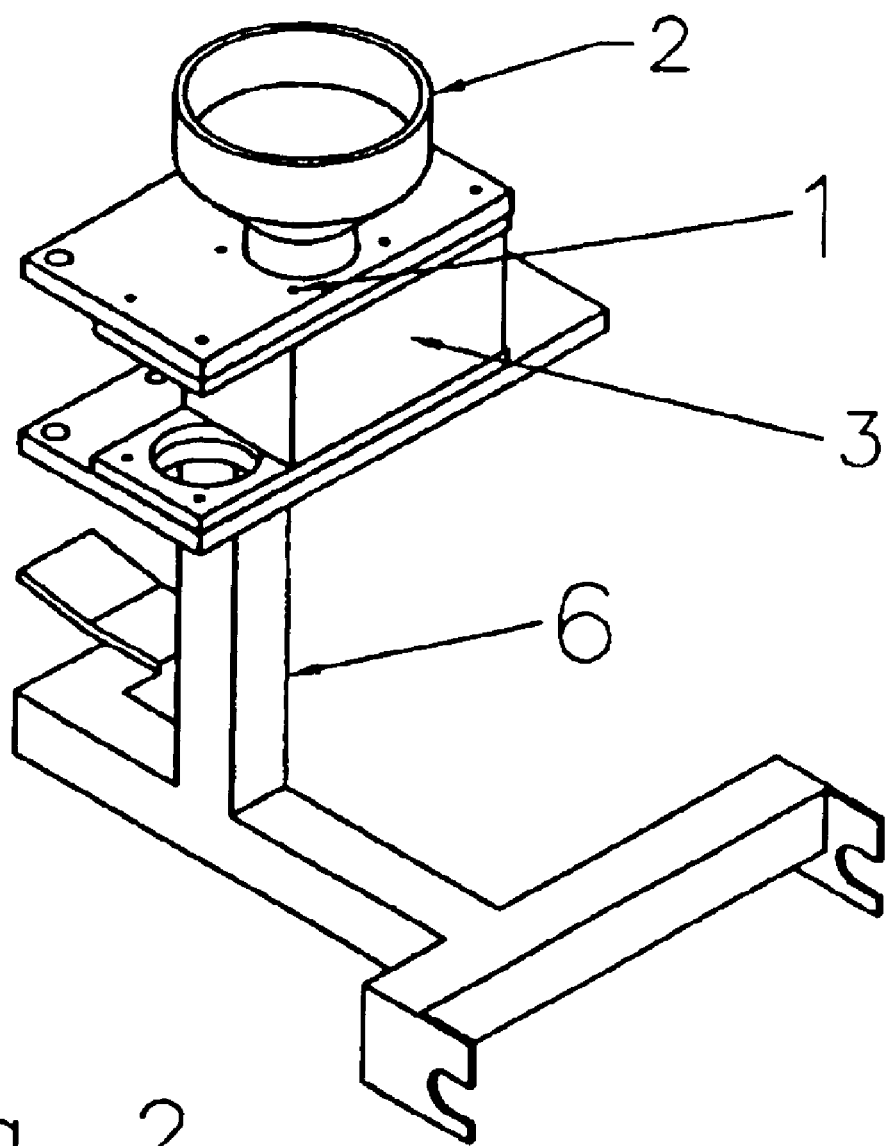
FIG. 2 is an illustration of the present invention showing only the top valve and the tubular frame which supports the said top valve. The finger pickup units and the bottom valve are excluded from this drawing.
Figure 3:
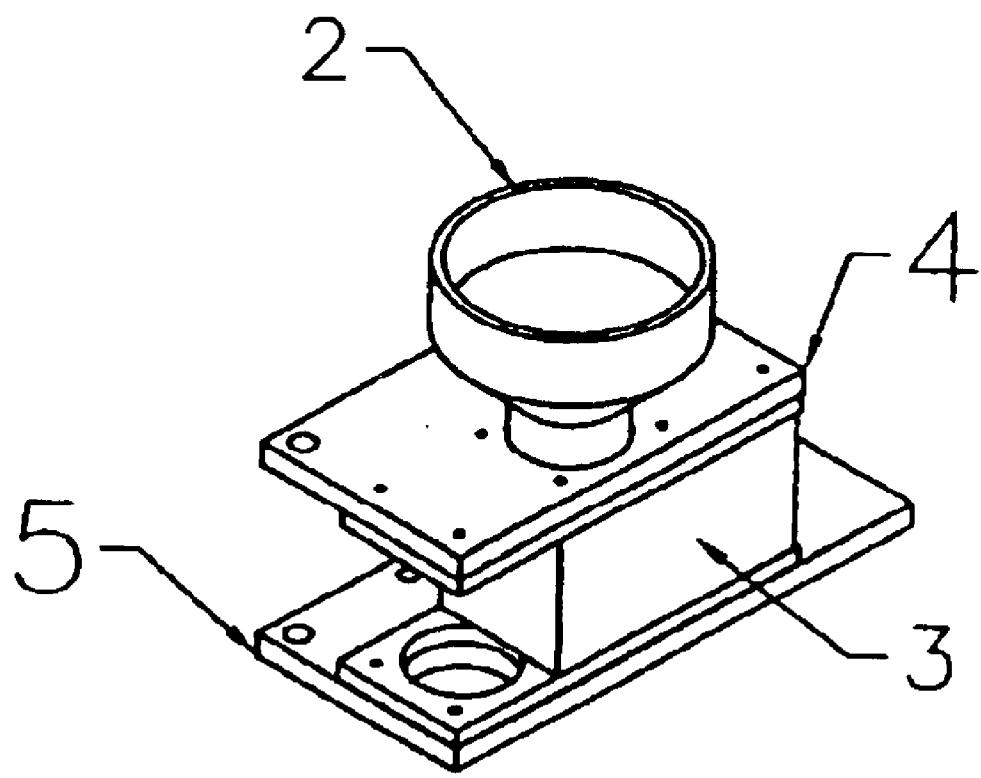
FIG. 3 shows the top valve by itself. It shows in more detail how the top valve is constructed by a loading funnel, top plate, sliding block in the middle, and a bottom plate.
Figure 7:
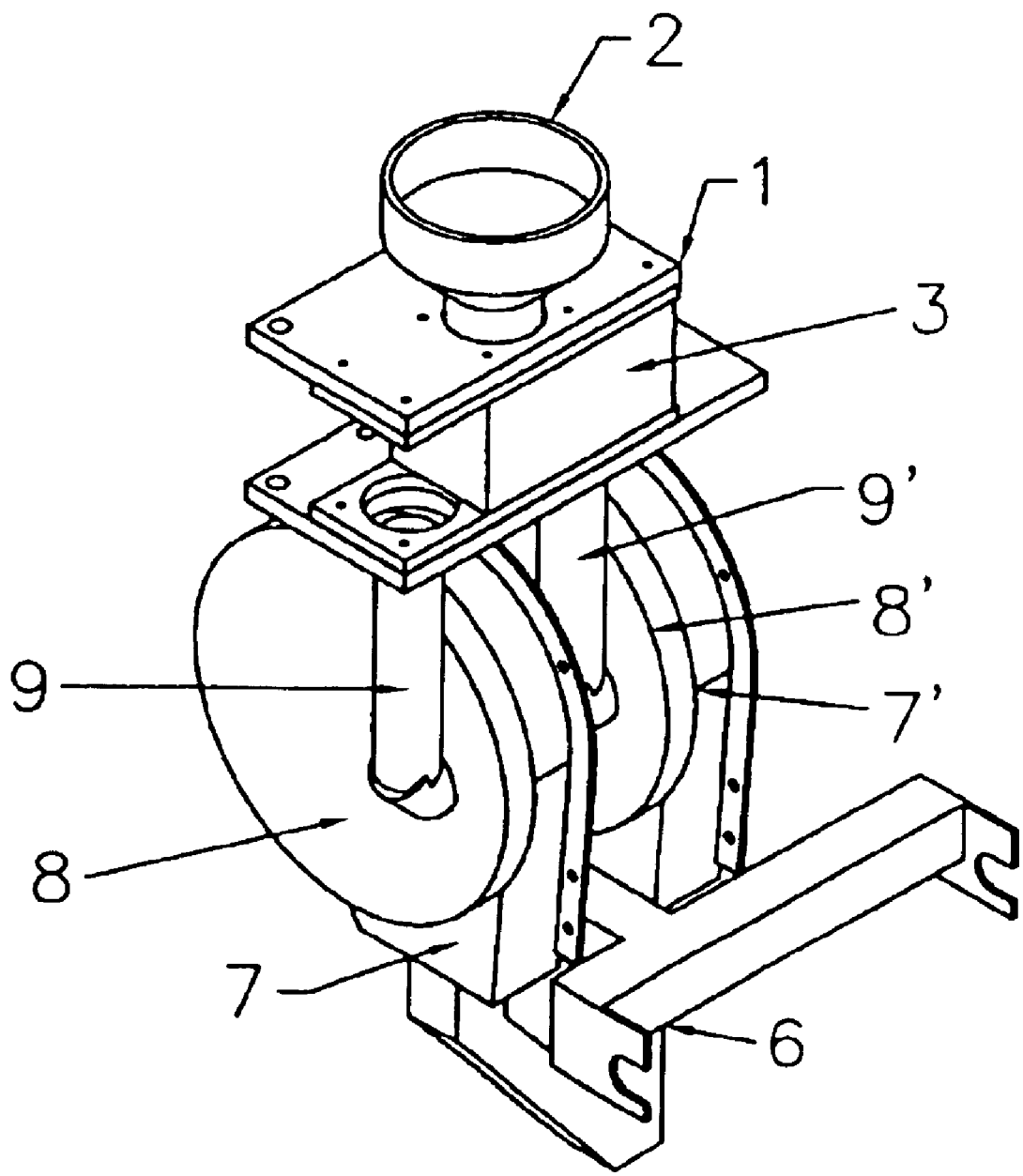
FIG. 7 is a perspective view of the plot planter of the present invention.

FIG. 1 illustrates how the loading tube 9 is positioned in reference to the top valve 1. FIG. 7 shows how there are two finger pickup units, a first finger pickup unit 7 and a second finger pickup unit 7' on the present invention. This is required because in a plot, one variety of seeds is planted right after another. In order to achieve an accurate beginning and end to a field of plots, the units 7 and 7' alternate which unit actually plants in that row. The left finger pickup unit 7 will plant the first, while the right finger pickup unit 7' will plant the second, and so on. Many of the parts in the present invention are fastened to the tubular frame 6 which is illustrated in FIG. 2 and FIG. 1. This tubular frame 6 acts as the structural member that holds the necessary parts together at the proper orientation.

Figure 5:
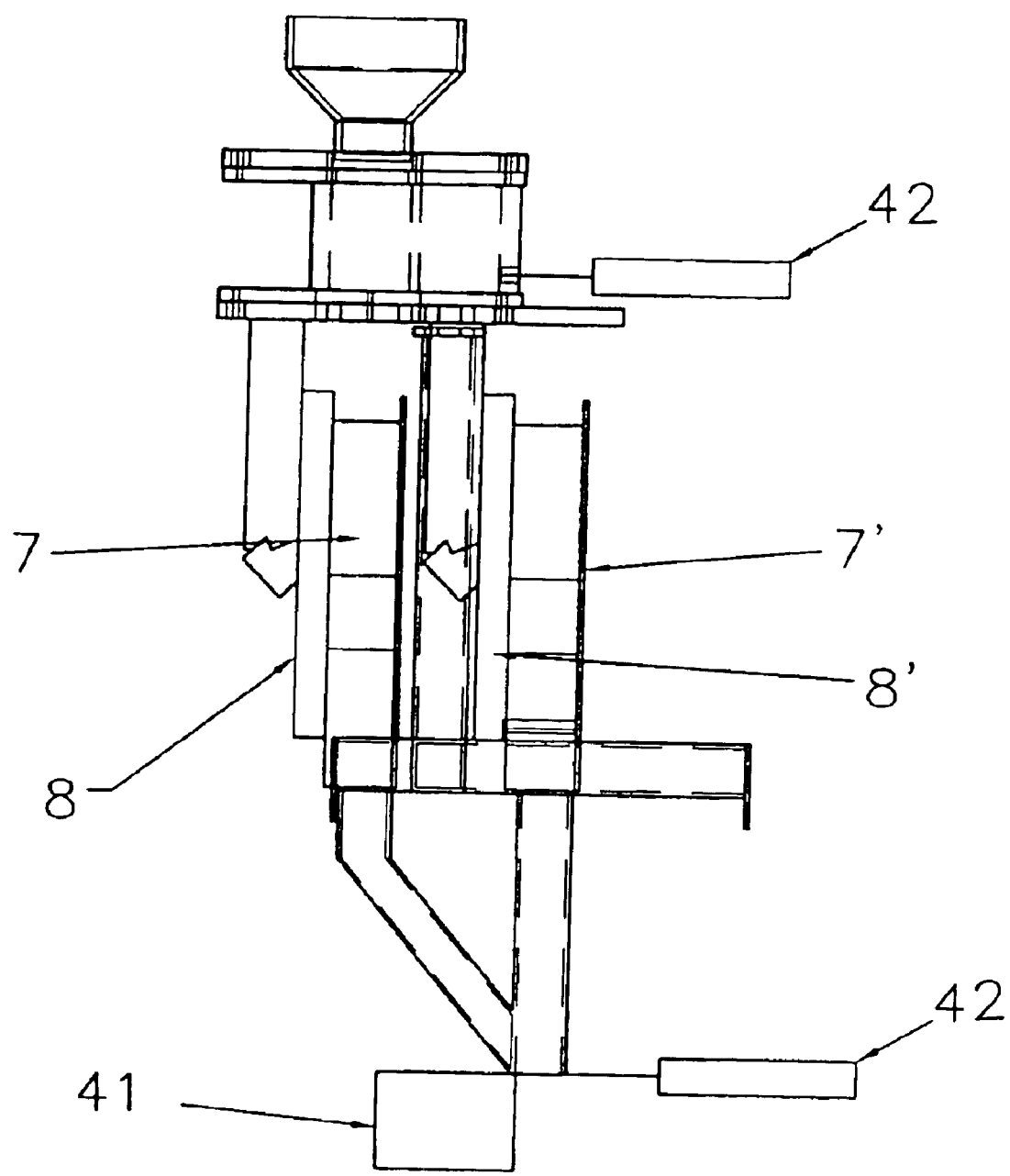
FIG. 5 shows how the two finger pickup units are positioned with a plate on one side.

A finger pickup unit 7 has several traits that are inherent to its design. They will begin planting extremely accurately and repeatable, however they do not stop planting accurately. One problem will a finger pickup unit is that without modification it will not plant the last several seeds in its mechanism. This is overcome by attaching a plastic plate 8 to the face of the finger pickup unit 7 (and plate 8' to unit 7'). This plate 8 reduces the volume inside the finger pickup unit 7 and enables it to plant its last several seeds. This also enables it to stop planting with accuracy. FIG. 5 shows how the two finger pickup units 7 and 7' are arranged and how they have a plates 8 and 8' on one side of them.

The seeds that have gone down the loading tube 9 and into the one finger pickup unit 7 as a result of the top valve 1 shifting have now begun planting. Since the top valve 1 has shifted, the operator tending that row can pour in another package of seeds into the loading funnel 2. These seeds will be held in the sliding block 3 until the top valve 1 shifts again. When doing so the seeds will fall down the other loading tube 9' and into the other finger pickup unit 7'. Both finger pickup units 7 and 7' are driven by a common drive which is the same drive that drove a single finger pickup unit 7 in an unmodified planter.

Underneath the finger pickup units 7 and 7' there is a bottom valve 10. This valve is responsible for controlling which finger pickup unit 7 or 7' is connected to the seed tube. The seed tube is what delivers the seed into the furrow created by the planter. These are standard parts on a planter and are not unique to the present invention. This bottom valve 10 has a flap inside of it that when positioned one way it will allow the seeds from the finger pickup unit 7 on the left to plant while the finger pickup unit on the right 7', should it be planting any seeds, will have a collection device to collect these excess seeds. When the bottom valve 10 is shifted to the right, the seeds from the right finger pickup unit 7' will continue down the seed tube while the seeds from the left finger pickup unit 7, should there be any, will be collected. The bottom valve 10 is shifted similarly as the top valve. Fluid or mechanical means of power can be used.

A simple programmable control mean 40 is provided. The control means take the form of a relay 30 to control the timing of both the top valve 1 and the bottom valve 10. The relay 30 began counting pulses generated from an encoder wheel 11 once the operator driving the tractor reset the relay with a simple switch 32. The encoder wheel 11 is positioned on the seed shaft 34. This seed shaft is responsible for turning the finger pickup units 7 and 7'.

Figure 6:
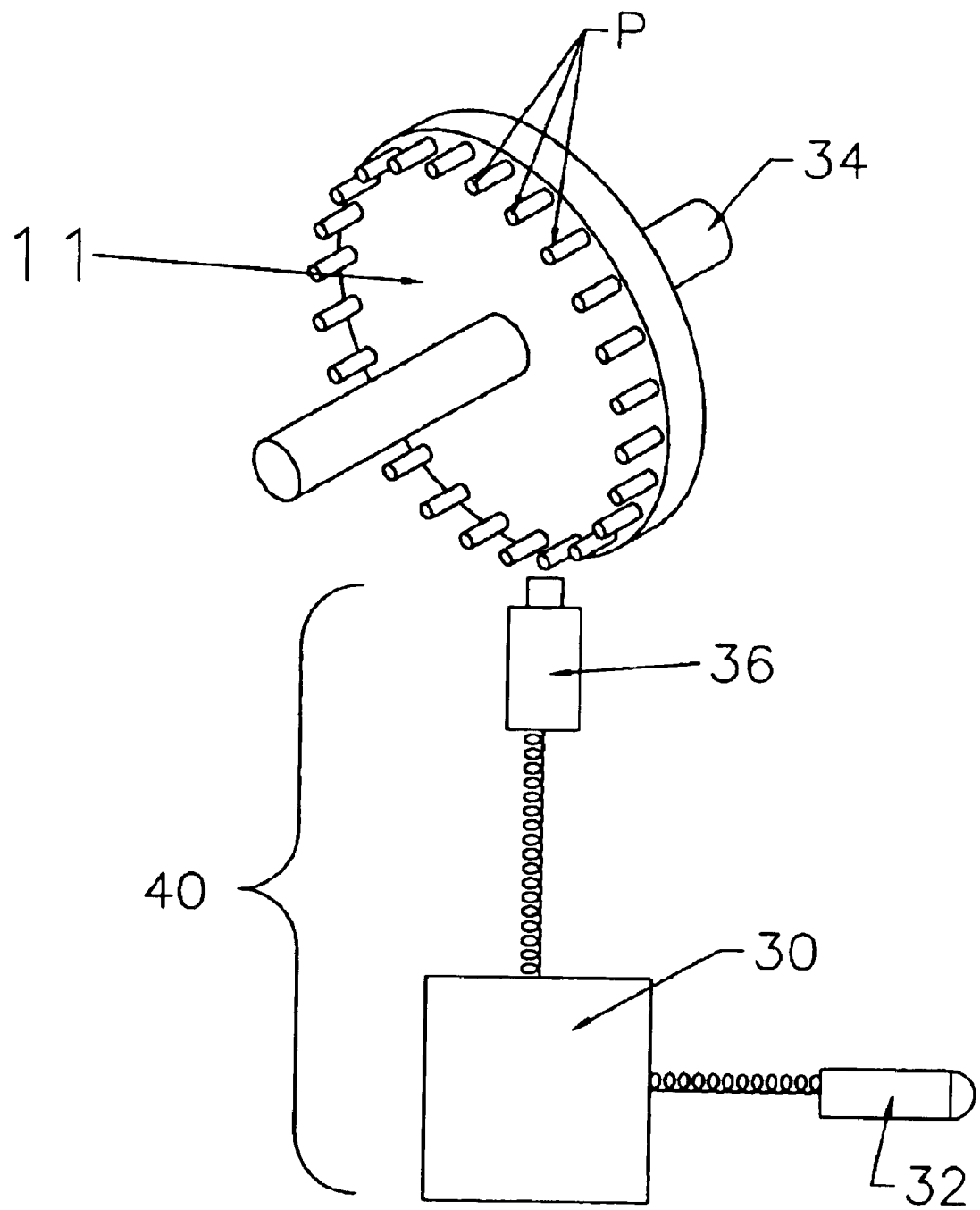
FIG. 6 shows the encoder wheel and the 24 pins positioned on its face.

FIG. 6 shows how the encoder wheel 11 is positioned on a shaft. The encoder wheel 11 has twenty four (24) pins P on its face. These pins are timed with the distance the planter travels so that $\frac{1}{24}^{th}$ of a revolution of the encoder wheel 11 equals a 2.5 inch forward movement of the planter. A sensor 36 counts these pins as they pass by it. The relay 30 accumulates these counts and at the appropriate time when the sensor 36 has counted a predetermined number of pins P, the relay will shift the top valve 1 and bottom valves 10 accordingly. This is how the planter is able to start and stop planting at a given point in the plot. With the counters in the programmable relay 30, the length of the plot and the length of the walkway can be adjusted. The operator who drives the tractor is responsible for switching the switch 32 at his control. He operates this switch 32: when a marker positioned on the tractor or planter crosses the center of the predetermined walkway. This resets the counters on the relay 30 and begins another cycle of the plot planter. When this cycle begins the top valve 1 is shifted first. After a few more counts from the encoder wheel 11, the bottom valve 10 shifts.

Referring to FIGS. 1 and 5, the plot planter includes a linear actuator 42 to move said sliding block 3 between the first block position and the second block position. A linear actuator 42 is also provided to move said bottom valve 10 between the first position and the second position. The linear actuators 42 are powered with one of fluid or mechanical power. The second valve further comprises a container 41 to collect excess seeds from the first finger pickup unit 7 and the second finger pickup unit 7' when such seeds are being collected and not planted. Such container 41 is preferably of sufficient volume to hold several seeds from several plots with excess seeds.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A plot planter comprising:
   a) a top valve including a sliding block movable between a first block position and a second block position, said sliding block having a first seed chamber adapted to receive a first type of seed and a second seed chamber adapted to receive a second type of seed;
   b) a first finger pickup unit communicating with said first seed chamber when said sliding block is in said first position and a second finger pickup unit communicating with said second seed chamber when said sliding block is in said second position;
   c) a bottom valve having a first position allowing seed from said first pickup unit to be delivered to a seed tube for planting while collecting seed from the second finger pickup unit, said bottom valve having a second position allowing seed from said second pickup unit to be delivered to said seed tube for planting while collecting seed from the first finger pickup unit; and
   d) programmable control means for controlling the timing of shifting of said top valve and said bottom valve.

2. A plot planter according to claim 1 further comprising a linear actuator to move said sliding block between said first block position and said second block position.

3. A plot planter according to claim 2 wherein said linear actuator is powered with one of fluid and mechanical power.

4. A plot planter according to claim 1 wherein said first finger pickup unit communicates with said first seed chamber through a first loading tube and said second finger pickup unit communicates with said second seed chamber through a second loading tube.

5. A plot planter according to claim 1 wherein said top valve, first and second finger pickup units and bottom valve are each mounted onto a tubular frame.

6. A plot planter according to claim 1 wherein said first finger pickup unit and second finger pickup unit are each provided with a plate member to reduce the volume within said pickup units whereby increasing the likelihood that the last seeds remaining in said finger pickup units will be planted.

7. A plot planter according to claim 1 wherein said first finger pickup unit and said second finger pickup unit are both driven by a common drive.

8. A plot planter according to claim 1 further comprising a linear actuator to move said bottom valve between said first position and said second position.

9. A plot planter according to claim 8 wherein said linear actuator is powered with one of fluid and mechanical power.

10. A plot planter according to claim 1 wherein said programmable control means further comprises a programmable relay having a sensor to count pulses generated from an encoder wheel.

11. A plot planter according to claim 10 wherein said first finger pickup unit and said second finger pickup unit are turned by a seed shaft and said encoder wheel is mounted on said seed shaft.

12. A plot planter according to claim 10 wherein said encoder wheel has a plurality of pins on a face thereof.

13. A plot planter according to claim 10 wherein said pins are timed with the distance that said plot planter travels whereby when the sensor counts a predetermined number of pins the plant plotter will have moved a known fixed distance and said relay will shift the top valve and bottom valve to cause seed of a different kind to be planted thereafter.

14. A plot planter according to claim 13 wherein said top valve is shifted first and after a few more counts the bottom valve is shifted.

15. A plot planter according to claim 10 wherein said relay can be reset to begin counting pins again by actuating a simple switch controlled by an operator of the plot planter.

16. A plot planter according to claim 10 wherein said encoder wheel has 24 pins thereon and said planter travels $\frac{1}{24}^{th}$ of a revolution of said encoder wheel when said planter travels 2.5 inches.

17. A plot planter according to claim 1 wherein said programmable control means can be programmed to precisely control the spacing between individual seeds of a first seed type being planted and the length of a row of a said first seed type before the top valve and bottom valve are shifted to plant said second seed type.

18. A plot planter according to claim 1 wherein said second valve further comprises a container to collect excess seeds from the first finger pickup unit and the second finger pickup unit when such seed are being collected and not planted.

19. A plot planter according to claim 18 wherein said container is of sufficient volume to hold several seeds from several plots with excess seeds.

20. A plot planter according to claim 1 further comprising a funnel to facilitate loading of seeds into said first seed chamber and said second seed chamber.

21. A plot planter according to claim 1 wherein when said sliding block is moved to a position intermediate said first block position and said second block position, there is no communication between said top valve and either of said first finger pickup unit and said second finger pickup unit.

* * * * *